United States Patent [19]
Fuller et al.

[11] Patent Number: 6,104,116
[45] Date of Patent: Aug. 15, 2000

[54] GENERATOR STATOR KEYBAR COMPLIANT CLAMP AND CURRENT SHUNT

[75] Inventors: Robert Fuller, Orlando, Fla.; Ross Guttromson, Woodinville, Wash.

[73] Assignee: Siemens Westinghouse Power Corporation, Orlando, Fla.

[21] Appl. No.: 09/293,705

[22] Filed: Apr. 16, 1999

[51] Int. Cl.[7] .............................. H02K 1/18; H02K 15/02
[52] U.S. Cl. .............................. 310/217; 310/42; 310/91; 310/259
[58] Field of Search .............................. 310/217, 91, 259, 310/258, 42; 29/596

[56] References Cited

U.S. PATENT DOCUMENTS

| 3,237,035 | 2/1966 | Hoffmann | 310/217 |
|---|---|---|---|
| 3,428,842 | 2/1969 | Harris | 310/217 |
| 4,082,974 | 4/1978 | Yamamoto et al. | 310/179 |
| 4,810,919 | 3/1989 | Ponce et al. | 310/217 |
| 4,891,540 | 1/1990 | Cooper et al. | 310/254 |
| 4,894,573 | 1/1990 | Simpson | 310/217 |
| 5,796,191 | 8/1998 | Schwanda | 310/58 |

*Primary Examiner*—Nestor Ramirez
*Assistant Examiner*—Burt Mullins

[57] ABSTRACT

A compliant clamp (20) for a power generator and associated methods are provided (see FIG. 5). The clamp (20) preferably includes an end plate (18) mounted to an end of a generator stator core (10) and a core attaching member (15) connected to the generator stator core (10) and positioned to connect the generator stator core (10) to a frame (12). The core attaching member (15) preferably has at least an end portion (22) extending outwardly from the end plate (18). At least one spring member (25) is preferably mounted to the end portion (22) of the core attaching member (15) for springingly biasing the end plate (18) inwardly toward the generator core (10). The clamp (20) further includes at least one retaining member (23) mounted to the end portion (22) of the core attaching member (15) for retaining the spring member (25) on the end portion (22) of the core attaching member (15), a current shunt member (30) mounted to the end portion (22) of the core attaching member (15), having at least one portion abuttingly contacting the end plate (18), and having another portion abuttingly contacting the retaining member (23) to thereby provide a current shunt path from the retaining member (23) to the end plate (18), and at least one insulating member (26) mounted to the end portion (22) of the core attaching member (15) and positioned between the current shunt member (30) and the at least one spring member (25).

26 Claims, 3 Drawing Sheets

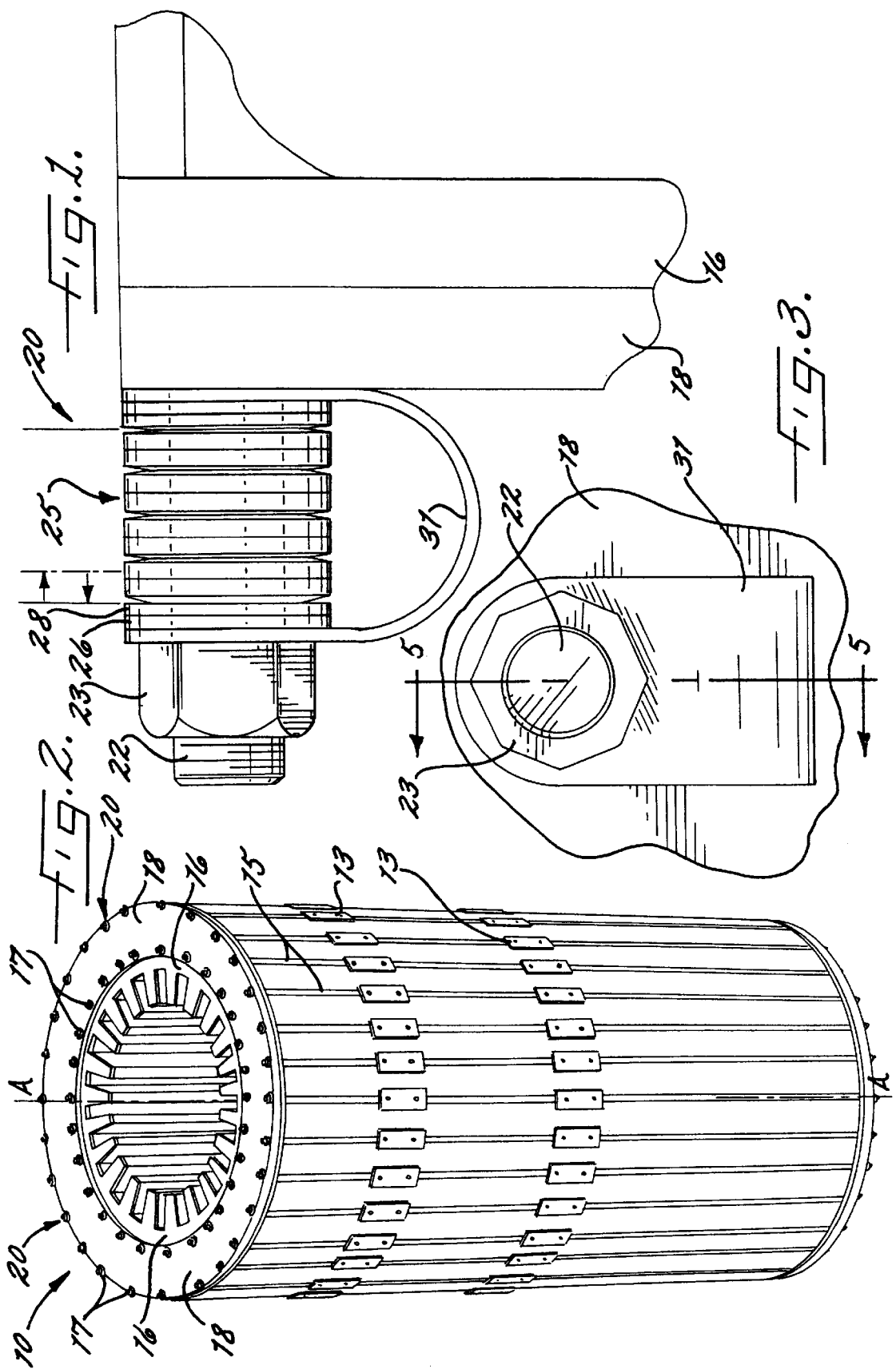

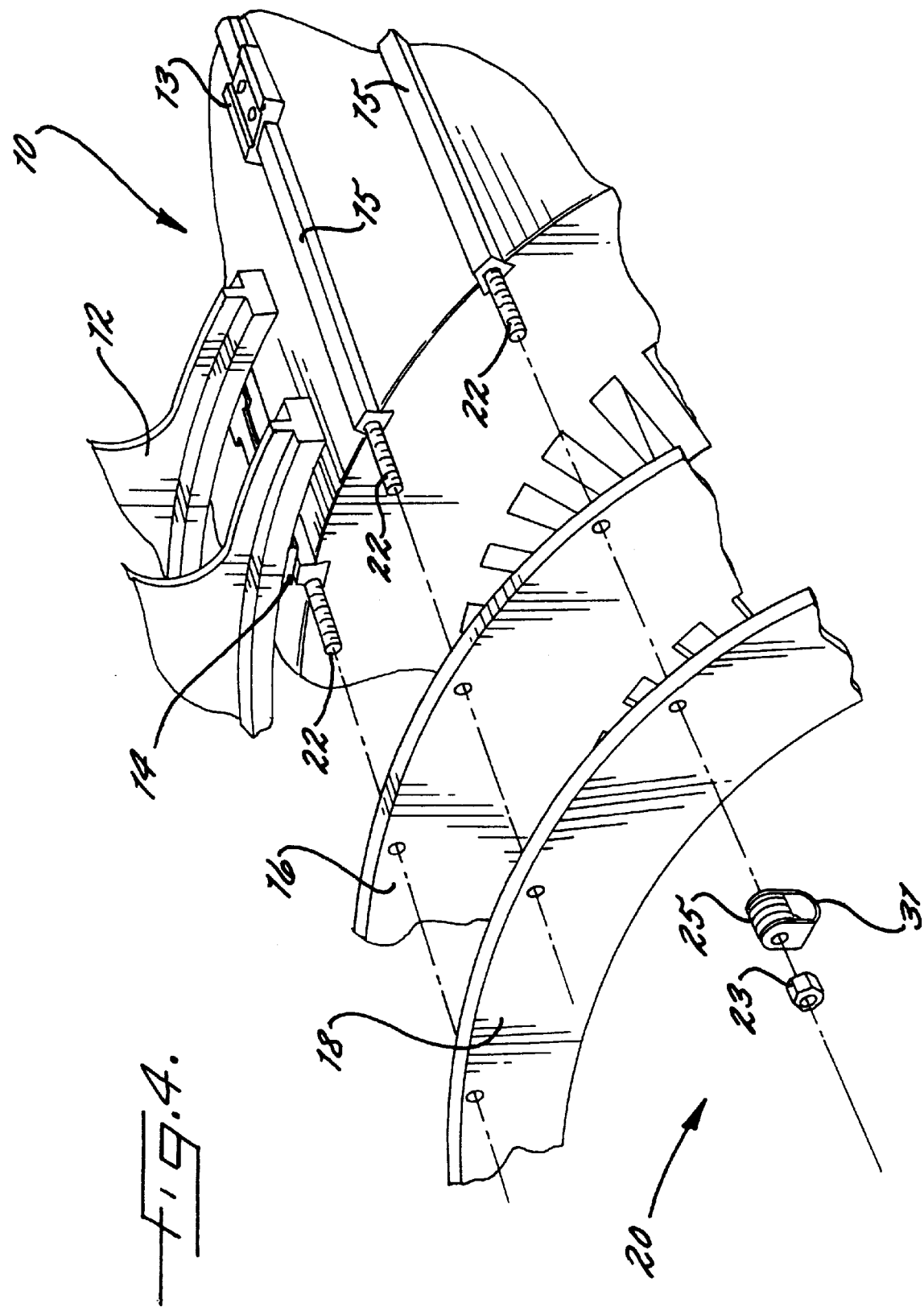

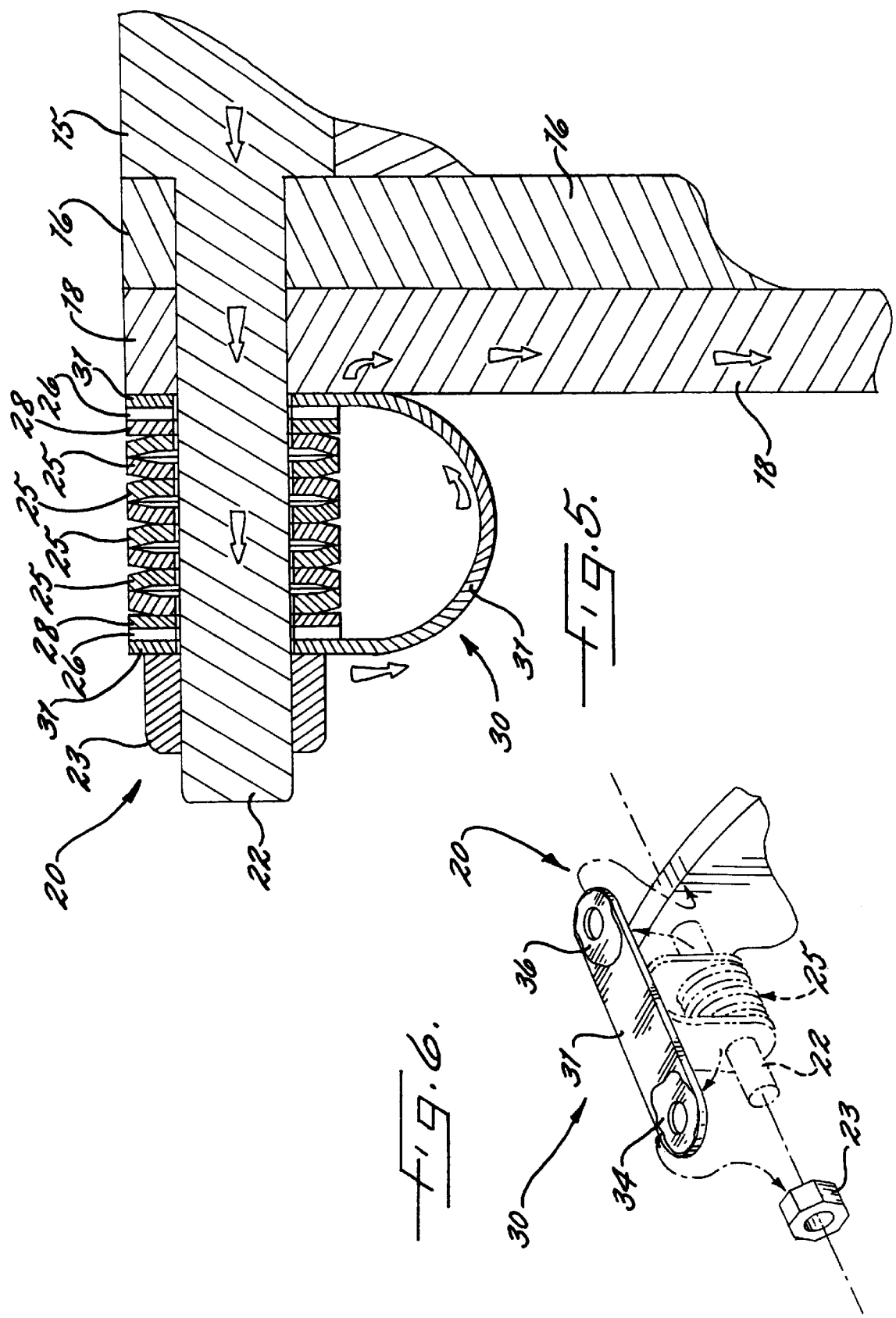

GENERATOR STATOR KEYBAR COMPLIANT CLAMP AND CURRENT SHUNT

FIELD OF THE INVENTION

This invention is related to the power generation industry and, more particularly, to the field of power generators.

BACKGROUND OF THE INVENTION

In the power generation industry, various elements of a power generator can be subject to fatigue, failure, or various damage over time. Such problems can be expensive and time consuming to repair and can cost down time for the power generator. An example of such a problem can arise when the stator core of a power generator compacts or relaxes over time. When compaction of the stator core occurs, some parts of the core such as through-bolts which extend through the core can adapt or compensate for the compaction. The through-bolts, for example, can be made of a material which compensates for the compaction. Other parts of the stator core, however, such as the stator keybars which attach the stator core to the stator frame, can have joints which loosen during the compaction process. Additionally, induced currents flowing through the stator keybars can damage the joints, including end plates of the stator core and washers or other elements of the joint.

SUMMARY OF THE INVENTION

In view of the foregoing, the present invention provides a power generator compliant clamp and associated methods which maintain the tightness of the joint during compaction or relaxation of the generator stator core and significantly reduces deterioration of the joint due to induced currents associated with the frame attachment to the generator stator core. The present invention also advantageously provides a power generator compliant clamp which significantly reduces induced currents in stator laminations associated with the generator stator core. The present invention additionally advantageously provides a clamp and associated methods which maintain pressure on the stator core keybar to end plate joints during core compaction or relaxation and allow current to pass through the clamp.

More particularly, a compliant clamp of the present invention preferably includes an end plate mounted to an end of a generator stator core and a core attaching member, e.g., a stator core keybar, connected to the generator stator core and positioned to connect the generator stator core to a frame. The core attaching member preferably has at least an end portion extending outwardly from the end plate along an axis extending generally parallel with the axis of the generator stator core. At least one spring member is preferably mounted to the end portion of the core attaching member for springingly biasing the end plate inwardly toward the generator core. The clamp further includes at least one retaining member mounted to the end portion of the core attaching member for retaining the spring member on the end portion of the core attaching member, a current shunt member mounted to the end portion of the core attaching member, having at least one portion abuttingly contacting the end plate, and having another portion abuttingly contacting the retaining member to thereby provide a current shunt path from the retaining member to the end plate, and at least one insulating member mounted to the end portion of the core attaching member and positioned between the current shunt member and the biasing means for insulating current flowing through the current shunt member from the spring member.

The present invention also includes a method of protecting against damage to a joint or portions of a generator core of a power generator. The method preferably includes providing a current shunt path from a core attaching member which attaches a generator stator core to a stator frame around at least one spring member mounted to an end portion of the core attaching member and to an end plate mounted to an end of the generator stator core. The end portion of the core attaching member can extend through the end plate, and the method can also include maintaining tightness of the end plate against the generator stator core during compaction of the generator stator core responsive to the at least one spring member.

The compliant clamp and associated methods of the present invention advantageously provide flexibility and adjustment in design of a clamp for various lengths or sizes of the power generator which still maintains the tightness of the joints. The compliant clamp can easily be retrofitted in existing power generators. The compliant clamp can further greatly reduce the service intervals for power generators by significantly reducing the risks of damage to the joints and end plates of the generator stator core.

BRIEF DESCRIPTION OF THE DRAWINGS

Some of the features, advantages, and benefits of the present invention having been stated, others will become apparent as the description proceeds when taken in conjunction with the accompanying drawings in which:

FIG. 1 is an enlarged side elevational view of a compliant clamp having a current shunt according to the present invention;

FIG. 2 is a perspective view of a generator stator core having a plurality of compliant clamps according to the present invention mounted thereto;

FIG. 3 is a front elevational view of a compliant clamp having a current shunt according to the present invention;

FIG. 4 is an exploded perspective view of a compliant clamp having a current shunt and mounted to a generator stator core according to the present invention;

FIG. 5 is a sectional view of a compliant clamp having a current shunt taken along line 5—5 of FIG. 3 and illustrating a current shunt path according to the present invention; and FIG. 6 is a perspective view of a current shunt strap of a compliant clamp and illustrating the mounting thereof in phantom view according to the present invention.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the illustrated embodiments set forth herein. Rather, these illustrated embodiments are provided so that this disclosure will be thorough and complete, and will fully convey the scope of the invention to those skilled in the art. Like numbers refer to like elements throughout, and prime and double prime notation if used indicate similar elements in alternative embodiments.

FIGS. 1–2 and 4 illustrate portions of a generator stator core 10 of a power generator. A power generator includes a generator stator core 10 and a stator frame 12 to which the stator core 10 is mounted (see FIG. 4). The stator core 10 is mounted to the frame 12 by a plurality of spaced-apart core attaching members, such as a stator keybar 15 as understood by those skilled in the art. Some of the stator keybars 15 may be mounted to the frame 12 and others may not be. A spring bar 14 is often positioned between the stator keybar 15 and the frame 12 to also assist in mounting the stator keybar 15 to the frame 12, e.g., by the use of key blocks 13. The spring bar 14 is often welded to the frame 12 and the keybar 15 is often mounted to the keyblocks 13 by the use of bolts or other fasteners. A fastener such as a set screw and/or the key blocks 13 can also attache or mount the stator keybars 15 to the stator core 10.

To the peripheral end portions of the generator stator core 10, a finger plate 16 is preferably mounted and extends downwardly from the keybars 15 to overlie the fingers of the stator core 10. An end plate 18 is preferably mounted adjacent and abuttingly contacting the finger plate 16. The end plate 18, however, preferably does not extend downwardly as far as the finger plate 16 as illustrated. A plurality of through-bolts 17 preferably extend through the end plate 18, the finger plate 16, and through the stator core 10. The core attaching members 15 of the stator core 10 also each have at least one keybar stud 22 connected to and extending outwardly from each keybar 15. The keybar stud 22 is preferably threaded or has at least portions thereof which are threaded and also extends through the end plate 18 and outwardly from the end plate 18 along an axis extending generally parallel with the center axis A (along line A—A of FIG. 2) of the generator stator core 10.

The compliant clamp 20 also includes biasing means which is preferably mounted to the end portion of the core attaching member 15 for biasing the end plate 18 inwardly toward the generator stator core 10. The biasing means is preferably formed by one or more spring members 25. The spring members 25 are preferably disc springs, e.g., Belleville washers as understood by those skilled in the art. The number of the plurality of disc springs 25 as illustrated, e.g., four shown, can vary depending on the length or size of the generator stator core 10 and are preferably in a series configuration. It will be understood by those skilled in the art that a parallel configuration can also be used according to the present invention.

The clamp 20 also preferably has retaining means mounted to the end portion of the core attaching member 15 for retaining the biasing means on the end portion of the core attaching member 15, e.g., the keybar stud 22. The keybar stud 22 is preferably threaded, and the retaining means can advantageously be a simple threaded nut 23 which acts as a positive mechanical stop for the stator core 10 or this portion of the stator core 10 during operation when the nut 23 is mounted on the keybar stud 22. The clamp 20, including the stop 23, advantageously prevents migration of the core 10 from the generator.

A current shunt member 30 is preferably mounted to the end portion of the core attaching member 15, has at least one portion abuttingly contacting the end plate 18, and has another portion abuttingly contacting the retaining member 23 to thereby provide a current shunt path, as illustrated by the arrows of FIG. 5, from the core attaching member, i.e., keybar 15, to the keybar stud 22, to the retaining member 23, through the current shunt member 30, and to the end plate 18. A shunt, as understood by those skilled in the art, is a device which has appreciable resistance or impedance connected in parallel across other devices or apparatus and diverts some (but not all) of the current from the other devices. As shown, the parallel path with the present invention is with the keybar stud 22 and can significantly reduce damage to the clamp 20 due to the current in the keybar 15 and keybar stud 22.

The clamp 20 also preferably has insulating means, e.g., a pair of insulating washers 26 such as formed of glass, ceramic, or other insulating material. Each insulating washer is preferably positioned at a respective end of the plurality of disc members 25. The insulating washers 26 are preferably also mounted to the end portion 22 of the core attaching member 15 and positioned between the current shunt member 30 and the disc springs 25 (as illustrated in FIG. 5) for insulating current flowing through the current shunt member 30 from the biasing means, e.g., the plurality of disc springs 25. The current shunt member 30, for example, can advantageously be a strap 31 having a first end with a first opening extending therethrough mounted to the end portion 22 of the core attaching member 15 and positioned between the retaining means 23 and the insulating means 26 and a second end with a second opening extending therethrough mounted to the end portion 22 of the core attaching member 15 and positioned between the insulating means 26 and the end plate 18. The strap 31 is preferably formed of copper and has a first corrosive protecting layer 34, e.g., preferably provided by silver plating, formed on the copper and positioned to abuttingly contact the retaining member 23 and a second corrosive protecting layer 36, e.g., preferably provided by silver plating, formed on the copper and positioned to abuttingly contact the end plate 18. The end plate 18 is preferably formed of aluminum and can also advantageously include a corrosive protective layer such as of silver plating as well. The silver plating also advantageously provides a slip layer for the strap 31 and the end plate 18.

The clamp 20 can still further include load distributing means positioned between the insulating means 26 and the biasing means 25 for distributing the load applied to the insulating means 26 and thereby inhibit failure of the insulating means. The load distributing means is preferably provided by at least a pair of flat washers 28 formed of stainless steel, and preferably without Teflon or other special coatings.

The compliant clamp 20 of the present invention as described above advantageously provides flexibility and adjustment in design of a clamp for various lengths or sizes of the power generator which still maintains the tightness of the joints. The compliant clamp 20 can easily be retrofitted in existing power generators to joints which often use only a steel washer coated with Teflon or other special coatings and which often deteriorate or become damaged from the current flowing through the keybar 15. The compliant clamp 15 can further greatly reduce the service intervals for power generators by significantly reducing the risks of damage to the joints and end plates 18 of the generator stator core 10.

As illustrated in FIGS. 1–5, the present invention also includes a method of protecting against damage to a joint or portions of a generator stator core 10 of a power generator. The method preferably includes providing a current shunt path (see arrows of FIG. 5) from a core attaching member 15 which can be used to attach a generator stator core 10 to a stator frame 12 around at least one spring member 25 mounted to an end portion 22 of the core attaching member 15 and to an end plate 18 mounted to an end of the generator stator core 10. The end portion 22 of the core attaching member 15 can extend through the end plate 18, and the method can also include maintaining tightness of the end plate 18 against the generator stator core 10 during compaction of the generator stator core 10 responsive to the at least one spring member 25, and more preferably a plurality of spring members 25. The maintaining step can advantageously include positioning a positive mechanical stop 23 to the end portion 22 of the core attaching member 15 so that the at least one spring member 25 is positioned between the stop 23 and the end plate 18, positioning an insulating material between the stop 23 and the at least one spring member 25 and between the at least one spring member 25 and the end plate 18, and distributing the load applied to the insulating material to thereby inhibit damage to the insulating material. The core attaching member 15 as described above preferably is a keybar, and the end portion 22 of the core attaching member 15 is preferably keybar stud mounted to and extending outwardly from the keybar 15.

Another method of protecting against damage to a joint or portions of a generator core 10 of a power generator preferably includes maintaining tightness of a portion of an end plate 18 which is mounted to a generator core 10 through a frame 12 against the generator stator core 10 during compaction of the generator core 10 responsive to at least one spring member 25 mounted to an end portion 22 of a core attaching member 15 positioned adjacent the end plate 18. The maintaining step can advantageously include positioning a positive mechanical stop 23 to the end portion 22 of the core attaching member 15 so that the at least one spring member 25 is positioned between the stop 23 and the end plate 18, positioning an insulating material between the stop 23 and the at least one spring member 25 and between the at least one spring member 25 and the end plate 18, and distributing the load applied to the insulating material to thereby inhibit damage to the insulating material. The core attaching member 15 as described above preferably is a keybar, and the end portion 22 of the core attaching member 15 is preferably a keybar stud mounted to and extending outwardly from the keybar 15.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed:

1. A compliant clamp for a power generator, the lamp comprising:

an end plate mounted to an end of a generator stator core;

a core attaching member connected to the generator stator core, the core attaching member having at least an end portion extending outwardly from the end plate along an axis extending generally parallel with the axis of the generator stator core;

biasing means mounted to the end portion of the core attaching member for biasing the end plate inwardly toward the generator stator core;

retaining means mounted to the end portion of the core attaching member for retaining the biasing means on the end portion of the core attaching member;

a current shunt member mounted to the end portion of the core attaching member, having at least one portion abuttingly contacting the end plate, and having another portion abuttingly contacting the retaining member to thereby provide a current shunt path from the retaining member to the end plate; and insulating means mounted to the end portion of the core attaching member and positioned between the current shunt member and the biasing means for insulating current flowing through the current shunt member from the biasing means.

2. A clamp as defined in claim 1, wherein the core attaching member comprises a keybar, wherein the end portion comprises a keybar stud connected to at least one end of the keybar and extending through the end plate, and wherein the biasing means, the retaining means, the current shunt member, and the insulating means are mounted to the keybar stud.

3. A clamp as defined in claim 2, wherein the keybar stud is threaded, and wherein the retaining means comprises a threaded nut mounted to the threaded keybar stud to provide a positive mechanical stop for the generator core.

4. A clamp as defined in claim 3, wherein the at least one spring member comprises a plurality of disc springs mounted in series.

5. A clamp as defined in claim 4, wherein the strap is formed of copper, and wherein the strap has a first corrosive protecting layer formed on the copper and positioned to abuttingly contact the retaining member and a second corrosive protecting layer formed on the copper and positioned to abuttingly contact the end plate.

6. A clamp as defined in claim 5, wherein the insulating means comprises at least a pair of insulating washers, wherein the load distributing means comprises at least a pair of flat washers, and wherein the biasing means comprises a plurality of disc springs.

7. A clamp as defined in claim 1, wherein the biasing means comprises at least one spring member.

8. A clamp as defined in claim 7, wherein the current shunt member comprises a strap having a first end mounted to the end portion of the core attaching member and positioned between the retaining means and the insulating means and a second end mounted to the end portion of the core attaching member and positioned between the insulating means and the end plate.

9. A clamp as defined in claim 8, further comprising a finger plate mounted between the end plate and the generator core, wherein the plurality of keybars are mounted to outer peripheries of the stator core, and wherein the generator core also includes a plurality of through-bolts extending through the end plate, the finger plate, and extending through the core.

10. A clamp as defined in claim 1, further comprising load distributing means positioned between the insulating means and the biasing means for distributing the load applied to the insulating means and thereby inhibit failure of the insulating means.

11. A compliant clamp for a power generator, the clamp comprising:

an end plate mounted to an end of a generator core;

a core attaching member connected to the generator core and positioned to connect the generator core to a frame, the core attaching member having at least an end portion extending outwardly from the end plate along an axis extending generally parallel with the axis of the generator core;

at least one spring member mounted to the end portion of the core attaching member for springingly biasing the end plate inwardly toward the generator core;

at least one retaining member mounted to the end portion of the core attaching member for retaining the at least one spring member on the end portion of the core attaching member;

a current shunt member mounted to the end portion of the core attaching member, having at least one portion abuttingly contacting the end plate, and having another portion abuttingly contacting the retaining member to thereby provide a current shunt path from the retaining member to the end plate; and at least one insulating member mounted to the end portion of the core attaching member and positioned between the current shunt member and the at least one spring member for insulating current flowing through the current shunt member from the spring member.

12. A clamp as defined in claim 11, wherein the core attaching member comprises a keybar, wherein the end portion comprises a keybar stud connected to at least one end of the keybar and extending through the end plate, and wherein the spring member, the retaining member, the current shunt member, and the insulating member are each mounted to the keybar stud.

13. A clamp as defined in claim 12, wherein the keybar stud is threaded, and wherein the retaining member comprises a threaded nut mounted to the threaded keybar stud to provide a positive mechanical stop for the generator core.

14. A clamp as defined in claim 11, wherein the at least one spring member includes a plurality of disc springs.

15. A clamp as defined in claim 14, wherein the plurality of disc springs is mounted in series.

16. A clamp as defined in claim 15, wherein the at least one insulating member comprises a pair of insulating washers, a first insulating washer positioned between the current shunt member and the plurality of disc springs adjacent the retaining member and a second insulating washer being positioned between the plurality of disc springs and the current shunt member adjacent the end plate, and wherein the current shunt member comprises a strap having a first end mounted to the end portion of the core attaching member and positioned between the retaining member and the first insulating washer and a second end mounted to the end portion of the core attaching member and positioned between the second insulating washer and the end plate.

17. A clamp as defined in claim 16, wherein the strap is formed of copper, and wherein the strap has a first corrosive protecting layer formed on the copper and positioned to abuttingly contact the retaining member and a second corrosive protecting layer formed on the copper and positioned to abuttingly contact the end plate.

18. A clamp as defined in claim 16, further comprising load distributing means positioned between the pair of insulating washers and the plurality of disc springs for distributing the load applied to the pair of insulating washers and thereby inhibit failure of the insulating washers.

19. A clamp as defined in claim 18, further comprising a finger plate mounted between the end plate and the generator core, wherein the load distributing means comprises at least a pair of flat washers formed of a steel material, wherein the plurality of keybars are mounted to outer peripheries of the stator core, and wherein the generator core also includes a plurality of through-bolts extending through the end plate, the finger plate, and extending through the core.

20. A method of protecting against damage to a joint or portions of a generator core of a power generator comprising the step of:

providing a current shunt path from a core attaching member which attaches a generator stator core to a stator frame around at least one spring member mounted to an end portion of the core attaching member and to an end plate mounted to an end of the generator stator core.

21. A method as defined in claim 20, wherein the end portion of the core attaching member extends through the end plate, and the method further comprising the step of maintaining tightness of the end plate against the generator stator core during compaction of the generator stator core responsive to the at least one spring member.

22. A method as defined in claim 21, wherein the maintaining step includes positioning a positive mechanical stop to the end portion of the core attaching member so that the at least one spring member is positioned between the stop and the end plate.

23. A method as defined in claim 22, wherein the maintaining step further includes positioning an insulating material between the stop and the at least one spring member and between the at least one spring member and the end plate.

24. A method as defined in claim 23, wherein the maintaining step further includes distributing the load applied to the insulating material to thereby inhibit damage to the insulating material, wherein the core attaching member comprises a keybar, and wherein the end portion of the core attaching member comprises a keybar stud mounted to and extending outwardly from the keybar.

25. A method of protecting against damage to a joint or portions of a generator core of a power generator comprising the step of:

maintaining tightness of a portion of an end plate which is mounted to a generator core through a frame against the generator stator core during compaction of the generator core responsive to at least one spring member mounted to an end portion of a core attaching member positioned adjacent the end plate, the maintaining step includes positioning a positive mechanical stop to the end portion of the core attaching member so that the at least one spring member is positioned between the stop and the end plate and positioning an insulating material between the stop and the at least one spring member and between the at least one spring member and the end plate.

26. A method as defined in claim 25, wherein the maintaining step further includes distributing the load applied to the insulating material to thereby inhibit damage to the insulating material, wherein the core attaching member comprises a keybar, and wherein the end portion of the core attaching member comprises a keybar stud mounted to and extending outwardly from the keybar.

* * * * *